United States Patent
Watanabe

(10) Patent No.: US 8,825,334 B2
(45) Date of Patent: Sep. 2, 2014

(54) VEHICLE BEHAVIOR CONTROL APPARATUS AND VEHICLE BEHAVIOR CONTROL METHOD

(75) Inventor: Ryochi Watanabe, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 731 days.

(21) Appl. No.: 13/057,114

(22) PCT Filed: Jun. 22, 2009

(86) PCT No.: PCT/IB2009/006012
§ 371 (c)(1),
(2), (4) Date: Feb. 1, 2011

(87) PCT Pub. No.: WO2010/015903
PCT Pub. Date: Feb. 11, 2010

(65) Prior Publication Data
US 2011/0137513 A1  Jun. 9, 2011

(30) Foreign Application Priority Data

Aug. 7, 2008  (JP) ................................. 2008-204897
Aug. 7, 2008  (JP) ................................. 2008-204898

(51) Int. Cl.
*B60T 8/00*  (2006.01)

(52) U.S. Cl.
USPC ................. 701/78; 701/83; 701/89; 180/197; 303/140; 303/146

(58) Field of Classification Search
USPC ......... 701/78, 83, 89; 180/197; 903/903, 916, 903/917; 303/140, 146
See application file for complete search history.

(56) References Cited

U.S. PATENT DOCUMENTS

| | | | |
|---|---|---|---|
| 2002/0032512 A1* | 3/2002 | Shimada | ......................... 701/89 |
| 2002/0087247 A1 | 7/2002 | Tanaka et al. | |
| 2006/0055237 A1 | 3/2006 | Taniguchi et al. | |

FOREIGN PATENT DOCUMENTS

| | | |
|---|---|---|
| EP | 1 201 520 | 5/2002 |
| JP | 2004 276711 | 10/2004 |
| JP | 2004 306662 | 11/2004 |
| JP | 2004 352166 | 12/2004 |
| JP | 2005 206075 | 8/2005 |
| JP | 2006 56383 | 3/2006 |

OTHER PUBLICATIONS

International Search Report issued Sep. 21, 2009, in PCT/IB09/006012 filed Jun. 22, 2009.

\* cited by examiner

*Primary Examiner* — Adam Tissot
(74) *Attorney, Agent, or Firm* — Oblon, Spivak, McClelland, Maier & Neustadt, L.L.P.

(57) ABSTRACT

A vehicle behavior control apparatus is equipped with a slip angle detector that detects a slip angle of a vehicle, a control amount calculation portion that calculates a control amount from the slip angle detected by the slip angle detector, a derivative of the slip angle, and a second order derivative of the slip angle, and a control portion that executes a behavior control for the vehicle based on the calculated control amount.

20 Claims, 6 Drawing Sheets

VEHICLE BEHAVIOR CONTROL APPARATUS AND VEHICLE BEHAVIOR CONTROL METHOD

FIELD OF THE INVENTION

Referring to FIG. 1B, the electronic control unit 50 may be identical in basic configuration to a known VSC device or VDIM device of an arbitrary type. The electronic control unit 50 is composed of a VSC portion 50*a*, a braking control device 50*b*, and a driving control device 50*c*. The VSC portion 50*a* calculates a turning state quantity (turning state index) representing the behavior of the turning vehicle, and determines target slip rates Si for the respective wheels and a torque down rate Td for reducing a drive output of the driving device on the basis of the turning state quantity. The braking control device 50*b* issues control commands to respective portions of the hydraulic circuit to control brake pressures applied to the respective wheels referring to the brake pedal depression amount θb from the brake pedal sensor 44 and the target slip rates Si for the respective wheels. The driving control device 50*c* controls an engine torque referring to an accelerator opening degree θa from an accelerator opening degree sensor 16 and the torque down rate Td. Based on the description discussed below in greater detail, the electronic control unit 50 is a means for calculating a control amount calculated from a vehicle body slip angle, a derivative of the vehicle body slip angle, and a second order derivative of the vehicle body slip angle; and a means for controlling the vehicle based on the calculated control amount.

BACKGROUND OF THE INVENTION

In the field of kinetic control of a vehicle, a behavior control art such as vehicle stability control (VSC), vehicle dynamic integrated management (VDIM), or the like, which improves the stability of the behavior of a turning vehicle in a yaw direction thereof through electronic control of the action of a braking/driving system or a steering system, is described in Japanese Patent Application Publication No. 2004-306662 (JP-A-2004-306662) or Japanese Patent Application Publication No. 2005-206075 (JP-A-2005-206075). In this VSC, when the behavior of the vehicle may be destabilized, the slip rates or slip amounts (hereinafter referred to as the slip rates or the like) of tires of respective wheels or the steering angles of the wheels are adjusted. Otherwise, the output of an engine or a motor is reduced or limited to restrain the vehicle from being accelerated. When a difference in braking/driving force between the right wheels of the vehicle and the left wheels of the vehicle is created or when the steering angles of the wheels are adjusted, a yaw moment is generated around the center of gravity of the vehicle. When the turning direction of the vehicle is thus changed and the vehicle speed is reduced, the lateral force required for the turning of the vehicle decreases. Therefore, the adjustment of the slip rates or the like of the respective wheels or the steering angles of the wheels and the limitation on acceleration of the vehicle or deceleration of the vehicle restrain the vehicle from behaving unstably, for example, spinning. As a result, the behavior of the vehicle in the yaw direction is stabilized.

In the behavior control as described above, more specifically, turning state quantities representing a turning state of the vehicle, for example, a spin state quantity or a skid state quantity as a function of a vehicle body slip angle or the like, an over-steer state quantity, an under-steer state quantity, and the like are referred to as indexes of the behavior of the vehicle. When these indexes deviate from values assumed in the stably running vehicle or exceed predetermined thresholds respectively, behavior stabilization control, namely, the creation of a yaw moment for stabilizing the behavior of the vehicle (behavior stabilization yaw moment), the limitation on acceleration of the vehicle, or deceleration of the vehicle is carried out. However, there may be a time delay between a time point at which the turning state quantities representing the behavior of the vehicle exceed the thresholds or predetermined ranges respectively and a time point at which the adjustment of the slip rates or the like of the respective wheels for behavior stabilization control (wheel slip control), automatic control of the steering angles of the wheels, or the control of a braking/driving device is started. Thus, in Japanese Patent Application Publication No. 2004-306662 (JP-A-2004-306662), the addition of derivatives of the turning state quantities or derivatives of some of the turning state quantities to the indexes of the behavior of the vehicle with a view to more swiftly restraining the behavior of the vehicle from tending to be destabilized is disclosed. A derivative of each quantity representing the behavior of the vehicle is a first order advance amount of the quantity representing the behavior of the vehicle. Therefore, the aforementioned time delay can be compensated for by adding those derivatives to the indexes for performing behavior stabilization control.

In vehicle behavior control disclosed in Japanese Patent Application Publication No. 2005-206075 (JP-A-2005-206075), a spin state quantity $K1\cdot\beta + K2\cdot d\beta/dt \ldots$ (A) as a linear sum of a vehicle body slip angle and a derivative of the vehicle body slip angle is referred to as an index of the behavior of the vehicle, namely, as a control amount in the control for restraining the vehicle from spinning (spin restraint control). It should be noted herein that K1 and K2 are weighting coefficients. This spin state quantity is a quantity equivalent to a yaw moment needed to return the vehicle body slip angle to 0. However, when behavior stabilization control is started referring only to this quantity, there may be caused a time delay as mentioned already:

SUMMARY OF THE INVENTION

The invention provides a behavior control apparatus that performs behavior stabilization control in such a manner as to restrain the spin behavior of a vehicle through the use of a control amount, that is, an amount calculated on the basis of a vehicle body slip angle, a derivative of the vehicle body slip angle, and a second order derivative of the vehicle body slip angle, and a vehicle behavior control method.

A first aspect of the invention relates to a vehicle behavior control apparatus. This control apparatus is equipped with a slip angle detector that detects a slip angle of a vehicle, a control amount calculation portion that calculates a control amount from the slip angle detected by the slip angle detector, a derivative of the slip angle, and a second order derivative of the slip angle, and a control portion that executes a behavior control for the vehicle based on the calculated control amount.

A second aspect of the invention relates to a vehicle behavior control apparatus. This control apparatus is a vehicle behavior control apparatus that restrains a vehicle from spinning on a basis of a control amount calculated from a vehicle body slip angle, a derivative of the vehicle body slip angle, and a second order derivative of the vehicle body slip angle. The second order derivative of the vehicle body slip angle has a contribution to the control amount which is reduced when within a predetermined period after a magnitude of the second order derivative of the vehicle body slip angle exceeds a predetermined value through steering of the vehicle either to a right or to a left, the magnitude of the second order derivative of the vehicle body slip angle exceeds the predetermined value through steering of the vehicle in the other direction. This vehicle behavior control apparatus may generate a yaw moment for restraining a spin on the basis of the control amount. Alternatively, the vehicle may be restrained from being accelerated on the basis of the control amount.

In the aforementioned configuration, abrupt steering of the vehicle from the right to the left or from the left to the right is repeated twice "when within the predetermined period after the magnitude of the second order derivative of the vehicle body slip angle exceeds the predetermined value through the steering of the vehicle either to the right or to the left, the magnitude of the second order derivative of the vehicle body slip angle exceeds the predetermined value through the steering of the vehicle in the other direction". "The predetermined period" may be an arbitrarily set period, for example, about two to several seconds. When the vehicle is abruptly steered during the running thereof, the magnitude of the vehicle body slip angle increases abruptly, and the second order derivative of the vehicle body slip angle changes prior to the vehicle body slip angle and the derivative of the vehicle body slip angle. Therefore, abrupt steering of the vehicle can be detected by detecting great fluctuations in the second order derivative of the vehicle body slip angle within a short period (the predetermined period).

According to the aforementioned configuration, when abrupt steering of the vehicle is repeated twice in different directions in performing behavior control for the vehicle to restrain the vehicle from spinning on the basis of the control amount calculated from the vehicle body slip angle, the derivative of the vehicle body slip angle, and the second order derivative of the vehicle body slip angle, the contribution of the second order derivative of the vehicle body slip angle is reduced. In the case where spin restraint control is performed on the basis of the control amount including the second order derivative of the vehicle body slip angle, even when the vehicle is abruptly steered, the second order derivative of the vehicle body slip angle swiftly responds to this abrupt steering of the vehicle, and the effect of restraining the vehicle from spinning is exerted. As a result, the vehicle body slip angle of the vehicle or the yaw rate of the vehicle is swiftly converged. However, when the vehicle is abruptly steered twice within a short period, the second order derivative of the vehicle body slip angle responds early in a manner corresponding to that tendency before the slip angle or the yaw rate converges in the course of the second steering. Thus, the operation of spin restraint control created on the basis of the control amount may weaken. Thus, in the apparatus according to the second aspect of the invention, as described above, when the vehicle is abruptly steered twice, the contribution of the second order derivative of the vehicle body slip angle is thereafter reduced in an attempt to avoid the early weakening of the operation of spin restraint control.

The contribution of the second order derivative of the vehicle body slip angle to the control amount may be ignored "when within the predetermined period after the magnitude of the second order derivative of the vehicle body slip angle exceeds the predetermined value through the steering of the vehicle either to the right or to the left, the magnitude of the second order derivative of the vehicle body slip angle exceeds the predetermined value through the steering of the vehicle in the other direction", namely, in a case where the contribution of the second order derivative of the vehicle body slip angle to the control amount is reduced when the vehicle is abruptly steered twice in succession in different directions. Thus, the vehicle body slip angle and the derivative of the vehicle body slip angle (the speed of change in the slip angle) are swiftly converged.

The contribution of the second order derivative of the vehicle body slip angle to the control amount may be reduced when within the predetermined period after the magnitude of the second order derivative of the vehicle body slip angle exceeds the predetermined value through the steering of the vehicle either to the right or to the left, the magnitude of the second order derivative of the vehicle body slip angle exceeds the predetermined value through the steering of the vehicle in the other direction and then becomes smaller than a second predetermined value smaller than the predetermined value.

The contribution of the second order derivative of the vehicle body slip angle to the control amount weakens the operation of spin restraint control when the second order derivative of the vehicle body slip angle fluctuates in the other direction upon grasping a symptom of the effect of the operation of spin restraint control at an early stage. Therefore, the contribution of the second order derivative of the vehicle body slip angle may be reduced when the direction of the amplitude of the second order derivative of the vehicle body slip angle is reversed after the vehicle is abruptly steered twice as described above, namely, when the magnitude of the second order derivative of the vehicle body slip angle becomes smaller than the second predetermined value (which is smaller than the predetermined value).

The contribution of the second order derivative of the vehicle body slip angle hinders the effect of spin restraint control when the sign of the second order derivative of the vehicle body slip angle becomes reverse to the sign of both the vehicle body slip angle and the derivative of the vehicle body slip angle. The contribution of the second order derivative of the vehicle body slip angle may be reduced when a sign of the second order derivative of the vehicle body slip angle becomes reverse to a sign of both the vehicle body slip angle and the derivative of the vehicle body slip angle.

When the contribution of the second order derivative of the vehicle body slip angle is reduced after the vehicle is abruptly steered twice as described above so that the vehicle body slip angle and a slip angular speed settle, it is preferable to ensure the availability of the effect of the second order derivative of the vehicle body slip angle in preparation for subsequent steering of the vehicle. The contribution of the second order derivative of the vehicle body slip angle to the control amount may be stopped from being reduced after the predetermined period elapses.

In the control apparatus according to the second aspect of the invention, the control amount may be given by a formula: $K1 \cdot \beta + K2 \cdot d\beta/dt + K3 \cdot d^2\beta/dt^2$ in which $\beta$, $d\beta/dt$, $d^2\beta/dt^2$, K1, K2, and K3 denote the vehicle body slip angle, the derivative of the vehicle body slip angle, the second order derivative of the vehicle body slip angle, and predetermined coefficients respectively. In this case, when the control amount increases, a yaw moment for restraining the vehicle from spinning is generated or the vehicle is restrained from being accelerated and hence from spinning. The contribution of the second order derivative of the vehicle body slip angle to the control amount may be reduced by setting the value of the coefficient K3 to 0.

In the control apparatus according to the second aspect of the invention, spin restraint control for the vehicle can be considered to appropriately adjust the contribution of the second order derivative of the vehicle body slip angle for expediting the operation and effect of the control in accordance with a steering condition of the vehicle, and to thereby exclude the operation when the contribution of the second order derivative of the vehicle body slip angle is unnecessary. According to the configuration of the invention, when abrupt steering of the vehicle is started, the contribution of the second order derivative of the vehicle body slip angle is valid. Therefore, while the vehicle body slip angle and the derivative of the vehicle body slip angle can be swiftly converged, the operation of the control can be prevented from being nullified early when the effect of the control starts manifesting itself. In other words, the configuration of the invention can be said to utilize the contribution of the second order derivative of the vehicle body slip angle to the control amount only when the contribution is valid. As a result, a more appropriate effect of restraining the vehicle from spinning can be expected than before.

A third aspect of the invention relates to a vehicle behavior control apparatus. This control apparatus is a vehicle behavior control apparatus that restrains a vehicle from spinning on a basis of a control amount calculated from a vehicle body slip angle, a derivative of the vehicle body slip angle, and a second order derivative of the vehicle body slip angle. In this control apparatus, the second order derivative of the vehicle body slip angle has a contribution to the control amount which is gradually reduced after a magnitude of the second order derivative of the vehicle body slip angle exceeds a predetermined value through steering of the vehicle either to a right or to a left. The vehicle may be restrained from spinning by a yaw moment generated on a basis of the control amount. Alternatively, the vehicle may be restrained from being accelerated on a basis of the control amount.

In the aforementioned configuration, "when the magnitude of the second order derivative of the vehicle body slip angle exceeds the predetermined value through the steering of the vehicle either to the right or to, the left", the vehicle is abruptly steered. When the vehicle is abruptly steered during the running thereof, the magnitude of the vehicle body slip angle abruptly increases, and the second order derivative of the vehicle body slip angle changes prior to the vehicle body slip angle and the derivative of the vehicle body slip angle. Therefore, abrupt steering of the vehicle can be detected by detecting great fluctuations in the second order derivative of the vehicle body slip angle.

According to the apparatus according to the foregoing third aspect of the invention, when the vehicle is abruptly steered in the case where vehicle behavior control for restraining the vehicle from spinning is performed on the basis of the control amount calculated from the vehicle body slip angle, the derivative of the vehicle body slip angle, and the second order derivative of the vehicle body slip angle, the contribution of the second order derivative of the vehicle body slip angle to the control amount is reflected but then is gradually reduced. In the case where spin restraint control is performed on the basis of the control amount including the second order derivative of the vehicle body slip angle, even when the vehicle is abruptly steered, the second order derivative of the vehicle body slip angle swiftly responds to this abrupt steering of the vehicle, and the effect of restraining the vehicle from spinning is exerted. As a result, the vehicle body slip angle of the vehicle or the yaw rate of the vehicle is swiftly converged. However, when the vehicle is once abruptly steered and then again abruptly steered (in general; in the other direction), the second order derivative of the vehicle body slip angle responds early in a manner corresponding to that tendency before the convergence of the slip angle or the yaw rate in the course of the second steering of the vehicle. Thus, the operation of spin restraint control created on the basis of the control amount may weaken. In the apparatus according to the third aspect of the invention, therefore, when the vehicle is once abruptly steered as described above, the contribution of the second order derivative of the vehicle body slip angle is thereafter gradually reduced. Thus, when abrupt steering of the vehicle is repeated, the contribution of the second order derivative of the vehicle body slip angle is restrained in an attempt to avoid the early weakening of the operation of spin restraint control.

In the control apparatus, the contribution of the second order derivative of the vehicle body slip angle to the control amount may be so reduced as to be ignored when a first predetermined period elapses. This "first predetermined period" may be set to a period from a time point at which the vehicle is first abruptly steered to a time point at which the magnitude of the derivative of the vehicle body slip angle starts decreasing during the second abrupt steering of the vehicle in the other direction. The phenomenon of the early weakening of the operation of spin restraint control resulting from the contribution of the second order derivative of the vehicle body slip angle causes a problem when the magnitude of the second order derivative of the vehicle body slip angle increases in response to the start of the second abrupt steering of the vehicle, the effect of the operation of spin restraint control then starts manifesting itself, and the second order derivative of the vehicle body slip angle thereby increases in the other direction, namely, when the magnitude of the derivative of the vehicle body slip angle starts decreasing (the magnitude of the derivative of the vehicle body slip angle reaches its peak). Thus, as described above, the first predetermined period may be set equivalent to a period from a time point at which the vehicle is first abruptly steered to a time point at which the magnitude of the derivative of the vehicle body slip angle reaches its peak in the course of the second abrupt steering of the vehicle, and the contribution of the second order derivative of the vehicle body slip angle may be ignored when the first predetermined period elapses, so that the vehicle body slip angle and the derivative of the vehicle body slip angle (the speed of change in slip angle) are swiftly converged.

On the other hand, when the contribution of the second order derivative of the vehicle body slip angle is reduced after the vehicle is abruptly steered so that the vehicle body slip angle and a slip angular speed settle, it is preferable to ensure the availability of the effect of the second order derivative of the vehicle body slip angle in preparation for subsequent steering of the vehicle. Accordingly, in the aforementioned apparatus according to the invention, the contribution of the second order derivative of the vehicle body slip angle to the control amount may be stopped from being reduced after the (second) predetermined period (which is longer than the first predetermined period) elapses. Further, when the vehicle is abruptly steered subsequently, the contribution of the second order derivative of the vehicle body slip angle may be reflected by the control amount for spin restraint control.

In this control apparatus, the control amount may be given by a formula: $K1 \cdot \beta + d\beta/dt + K3 \cdot d^2\beta/dt^2$ in which $\beta$, $d\beta/dt$, $d^2\beta/dt^2$, K1, K2, and K3 denote the vehicle body slip angle, the derivative of the vehicle body slip angle, the second order derivative of the vehicle body slip angle, and predetermined coefficients respectively. In this case, when the control amount increases, a yaw moment for restraining the vehicle from spinning is generated or the vehicle is restrained from being accelerated and hence from spinning. The contribution of the second order derivative of the vehicle body slip angle to the control amount may be gradually reduced by gradually reducing the magnitude of the coefficient K3.

Spin restraint control for the vehicle can be considered to appropriately adjust the contribution of the second order derivative of the vehicle body slip angle for expediting the operation and effect of the control in accordance with a steering condition of the vehicle, and to thereby exclude the operation when the contribution of the second order derivative of the vehicle body slip angle is unnecessary. According to this configuration, when abrupt steering of the vehicle is started, the contribution of the second order derivative of the vehicle body slip angle is valid. Therefore, while the vehicle body slip angle and the derivative of the vehicle body slip angle can be swiftly converged, the operation of the control can be prevented from being nullified early when the effect of the control starts manifesting itself. In other words, the configuration of the invention can be said to utilize the contribution of the second order derivative of the vehicle body slip angle to the control amount when the contribution is valid. As a result, a more appropriate effect of restraining the vehicle from spinning can be expected.

A fourth aspect of the invention relates to a vehicle behavior control method. This control method includes detecting a slip angle of a vehicle, calculating a control amount from the detected slip angle, a derivative of the slip angle, and a second order derivative of the slip angle, and performing behavior control for the vehicle on a basis of the calculated control amount.

A fifth aspect of the invention relates to a vehicle behavior control method. This control method includes detecting a vehicle body slip angle, calculating a control amount from the detected slip angle, a derivative of the slip angle, and a second order derivative of the slip angle, and reducing a contribution of the second order derivative of the vehicle body slip angle to the control amount when within a predetermined period after a magnitude of the second order derivative of the vehicle body slip angle exceeds a predetermined value through steering of the vehicle either to a right or to a left, the magnitude of the second order derivative of the vehicle body slip angle exceeds the predetermined value through steering of the vehicle in the other direction.

A sixth aspect of the invention relates to a vehicle behavior control method. This control method includes detecting a vehicle body slip angle, calculating a control amount from the detected vehicle body slip angle, a derivative of the vehicle body slip angle, and a second order derivative of the vehicle body slip angle, and gradually reducing a contribution of the second order derivative of the vehicle body slip angle to the control amount after a magnitude of the second order derivative of the vehicle body slip angle exceeds a predetermined value through steering of a vehicle either to a right or to a left.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Figure 1A:
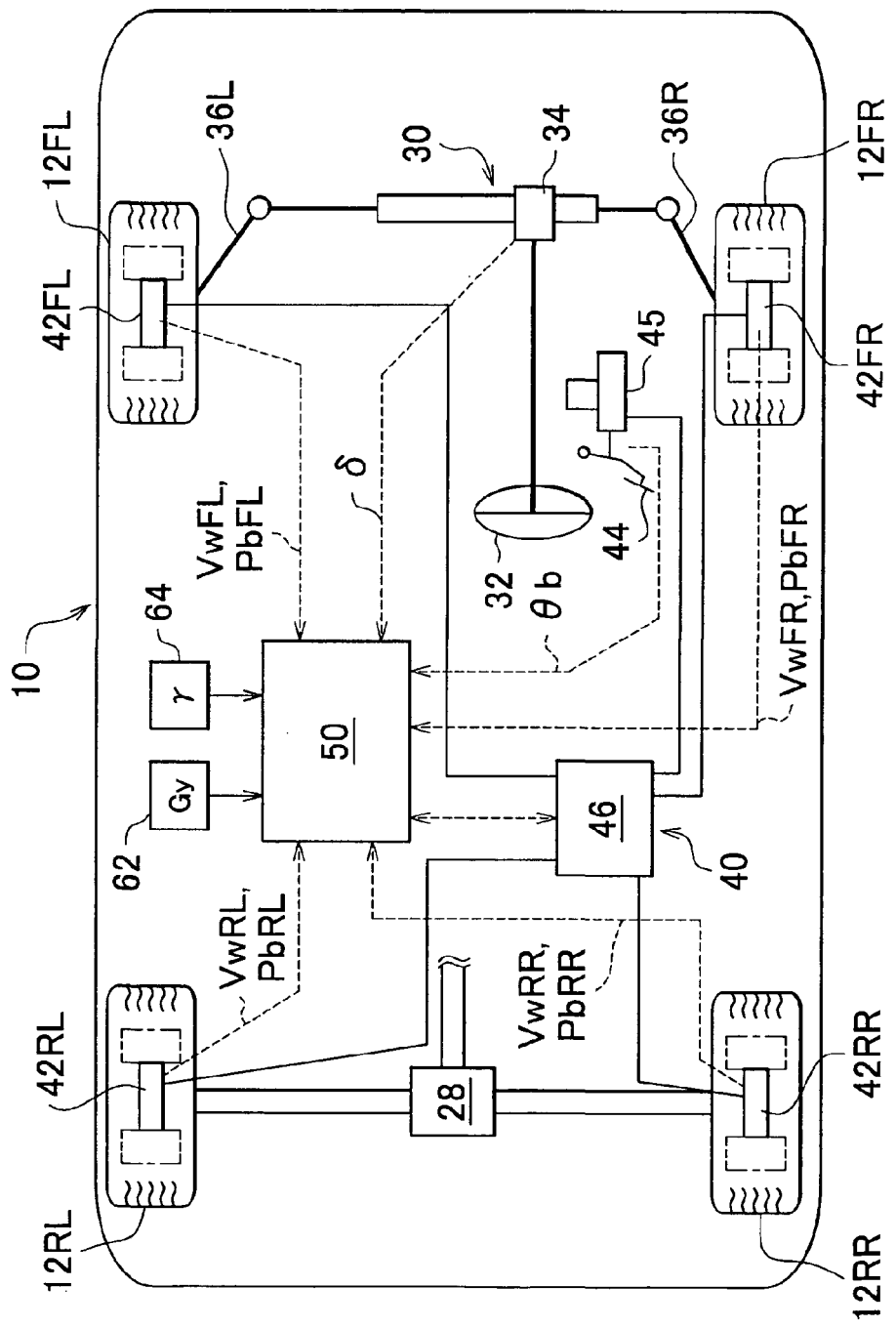
FIG. 1A is a schematic view of a vehicle mounted with a behavior control apparatus according to an embodiment of the invention.

First of all, the first embodiment of the invention will be described. FIG. 1A is a schematic view of a vehicle mounted with a behavior control apparatus according to an embodiment of the invention. In FIG. 1A, a vehicle 10 having a front-right wheel 12FR, a front-left wheel 12FL, a rear-right wheel 12RR, and a rear-left wheel 12RL is mounted with driving system device (only partly shown) that applies a braking force or a driving force to the respective wheels (only to the rear wheels in the illustrated example because the vehicle 10 is a rear-wheel-drive vehicle), a steering device 30 for controlling a steering angle of the front wheels (a steering device for the rear wheels may further be provided), and a braking system device 40 that applies a braking force to the respective wheels. The driving system device is configured such that a driving torque or a rotational force is transmitted to the rear wheels 12RL and 12RR from an engine (not shown) and/or an electric motor (not shown) via a differential gear mechanism 28 or the like. The vehicle may be a front-wheel-drive vehicle or a four-wheel-drive vehicle. In this case, a rotational force of the driving system device is transmitted to the front wheels or all the wheels. Further, the steering device may be a power steering device that transmits rotation of a steering wheel 32 operated by a driver to tie rods 36R and 36L to turn the front wheels 12FR and 12FL while boosting a force of the rotation by means of a boosting device 34.

The braking system device 40 is an electronically controlled hydraulic braking device designed such that a hydraulic circuit 46 communicating with a master cylinder 45 operated in response to depression of a brake pedal 44 by the driver adjusts a brake pressures in wheel cylinders 42$i$ (i=FL, FR, RL, and RR as will hold true hereinafter) installed on the respective wheels, namely, braking forces applied to the respective wheels. The hydraulic circuit 46 is provided with various valves (a master cylinder cut valve, an oil pressure retention valve, and a pressure reduction valve) through which the wheel cylinders on the respective wheels selectively communicate with the master cylinder 45, an oil pump, or an oil reservoir (not shown) in a normal mode. In normal operation, a pressure in the master cylinder 45 is supplied to the respective wheels cylinder 42$i$ in response to depression of the brake pedal 44. However, in the case where braking forces applied to the respective wheels are individually or independently adjusted to perform behavior control according to the embodiment or any other type of braking force distribution control, the aforementioned various valves are actuated on the basis of a command of an electronic control unit 50. The brake pressure in each of the wheel cylinders for the wheels is so controlled as to coincide with a corresponding target pressure on the basis of a detection value of a corresponding one of pressure sensors. The brake system device 40 may be designed to pneumatically or electromagnetically apply braking forces to the respective wheels or may be arbitrarily designed by those skilled in the art.

As already mentioned, behavior control according to the invention and operation control of the brake system device 40 are performed by the electronic control unit 50. The electronic control unit 50 may include a drive circuit and a normally designed microcomputer having a CPU, a ROM, a RAM, and an input/output port device that are coupled to one another by a bidirectional common bus. In an exemplification of FIG. 1A, detection values such as a brake pedal depression amount θb, a steering angle δ, wheel speeds Vwi, pressures Pbi in the wheel cylinders for the respective wheels, a lateral acceleration Gy, a yaw rate γ, and the like are input to the electronic control unit 50 from sensors provided at respective portions of the vehicle. However, various parameters required for various types of control to be performed in the vehicle according to this embodiment of the invention, for example, various detection signals such as a longitudinal G sensor value and the like may be input to the electronic control unit 50.

Figure 1B:
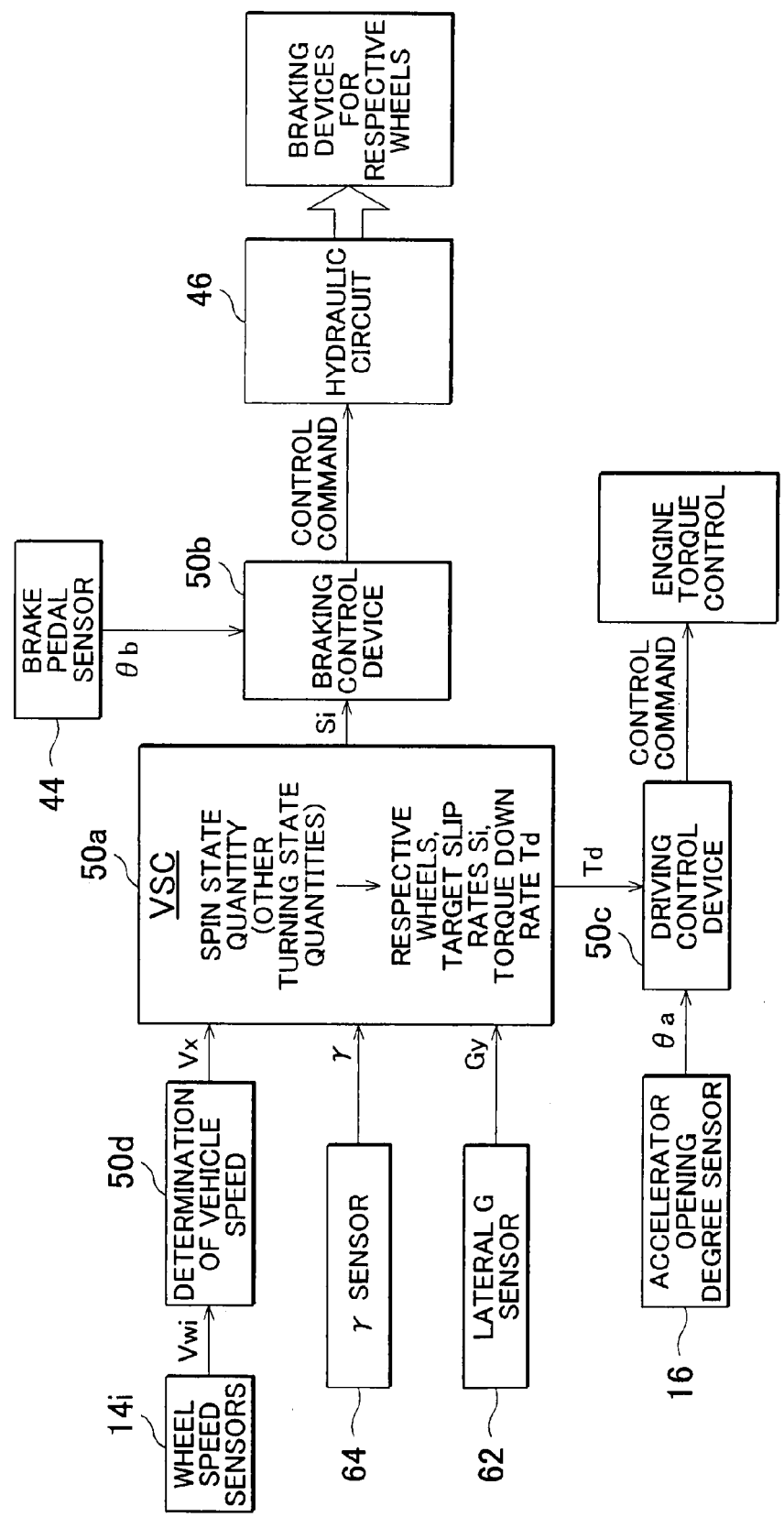
FIG. 1B is a control block diagram of an electronic control unit for the vehicle mounted with the behavior control apparatus according to the invention.

FIG. 1B shows the electronic control unit 50, which realizes the behavior control apparatus according to the embodiment of the invention, in the form of control blocks. The configuration and operation of the illustrated control apparatus are realized in the processing operations of the CPU and the like in the electronic control unit 50 during the driving of the vehicle.

Referring to FIG. 1B, the electronic control unit 50 may be identical in basic configuration to a known VSC device or VDIM device of an arbitrary type. The electronic control unit 50 is composed of a VSC portion 50a, a braking control device 50b, and a driving control device 50c. The VSC portion 50a calculates a turning state quantity (turning state index) representing the behavior of the turning vehicle, and determines target slip rates Si for the respective wheels and a torque down rate Td for reducing a drive output of the driving device on the basis of the turning state quantity. The braking control device 50b issues control commands to respective portions of the hydraulic circuit to control brake pressures applied to the respective wheels referring to the brake pedal depression amount θb from the brake pedal sensor 44 and the target slip rates Si for the respective wheels. The driving control device 50c controls an engine torque referring to an accelerator opening degree θa from an accelerator opening degree sensor 16 and the torque down rate Td.

The VSC portion 50a calculates a spin state quantity SP as the turning state quantity (turning state index) representing the behavior of the turning vehicle according to a formula shown below.

$$SP = K1 \cdot \beta + K2 \cdot d\beta/dt + K3 \cdot d^2\beta/dt^2 \quad (1)$$

It should be noted herein that β, dβ/dt, and $d^2\beta/dt^2$ denote a vehicle body slip angle, a derivative of the vehicle body slip angle, and a second order derivative of the vehicle body slip angle respectively, and that K1, K2, and K3 are experimentally determined weighting coefficients. This spin state quantity is an index of a spin state or skid amount of the turning vehicle. The sum of the first term and the second term is equivalent to the magnitude of a (stabilization) yaw moment needed to return the vehicle body slip angle to 0, and the term of the second order derivative of the vehicle body slip angle (the third term) is further added to accelerate the response of control.

In performing control using this linear sum, behavior stabilization control is started as soon as a symptom of the spinning of the vehicle appears. Therefore, the possibility of the vehicle going into a spin can be more reliably avoided. In the case where behavior stabilization control is performed using the control amount including the second order derivative of the vehicle body slip angle, when abrupt steering of the vehicle is repeated, the operation of behavior stabilization control weakens early. As a result, a phenomenon of a loss in the effect of restraining the vehicle from spinning may arise. This phenomenon is considered to result from the fact that the second order derivative of the vehicle body slip angle responds early and hence captures the symptom of the effect of behavior stabilization control as soon as this effect starts manifesting itself after the start of behavior stabilization control. Accordingly, in order to avoid the weakening of this spin restraint effect, it is necessary to appropriately adjust the contribution of the second order derivative of the vehicle body slip angle to the control amount in accordance with a steering condition.

In the aforementioned formula (1), the derivative dβ/dt of the vehicle body slip angle is given by a formula: dβ/dt=Gy/Vx−γ . . . (2a), using a lateral acceleration Gy, a vehicle speed Vx, and a yaw rate γ. A vehicle speed determination portion 50d may determine the vehicle speed Vx from the values of the wheel speeds Vwi for the respective wheels, which are obtained from the wheel speed sensors, in any arbitrary mode. However, in the case where a vehicle speed sensor is provided, a detection value thereof may be used. Further, the vehicle body slip angle is given through integration of the formula (2a), namely, by a formula: β=∫(Gy/Vx−γ)dt . . . (2b). The second order derivative of the vehicle body slip angle is given through differentiation of the formula (2a), namely, by a formula: $d^2\beta/dt^2 = d(Gy/Vx-\gamma)/dt$ . . . (2c).

A so-called "dead zone" may be provided for the second order derivative of the vehicle body slip angle. That is, when the absolute value of the value obtained by differentiating (dβ/dt) is smaller than a predetermined value in calculating the second order derivative $d^2\beta/dt^2$ of the vehicle body slip angle from the derivative dβ/dt of the vehicle body slip angle, the second order derivative of the vehicle body slip angle is forcibly set to 0 ($d^2\beta/dt^2 \leftarrow 0$). However, in order to prevent the value of the spin state quantity from discontinuously changing, a value obtained by subjecting the value obtained by differentiating (dβ/dt) or the second order derivative $d^2\beta/dt^2$ of the vehicle body slip angle, which assumes 0, to a first order regression filter processing (smoothing processing) is adopted in calculating the linear sum according to the formula (1).

When the spin state quantity is calculated according to the formula (1), the VSC portion 50a further determines the target values Si for the slip rates of the respective tires (tire forces) for generating a yaw moment for correcting the turning behavior of the vehicle such that the spin state quantity becomes equal to 0. The target slip rates Si are transmitted to the braking control device 50b. The braking control device 50b issues control commands (commands for various valves and pumps in the circuit) to the hydraulic circuit 46 of the braking system device such that the target slip rates Si for the respective wheels are achieved, in consideration of the depression amount of the brake pedal 44, and actuates the braking devices (the wheel cylinders) for the respective wheels. Typically, when the magnitude of the spin state quantity is larger than a predetermined threshold larger than 0, the target slip rate Si of that one of the front wheels which is located outside with respect to the turning direction is selectively increased. Thus, a yaw moment in such a direction as to turn the vehicle body outward with respect to the turning direction is generated, and the vehicle is hence restrained from spinning (a rear portion of the vehicle is restrained from skidding outward with respect to the turning direction). Instead of generating a yaw moment necessary and sufficient for correction of the behavior of the vehicle, the braking control device 50b performs distribution control of the slip rates for the respective wheels in such a direction as to generate a yaw moment of an appropriate magnitude in accordance with the magnitude of the spin state quantity. As a result, the slip rates are adjusted such that each turning state quantity settles to a value equal to or smaller than a predetermined value through feedback control.

Further, when the aforementioned spin state quantity is larger than the predetermined threshold, a lateral force necessary for the turning of the vehicle cannot be generated, or the tire forces for the rear wheels may have reached their limit. Thus, the drive output may be limited to restrain the vehicle from accelerating. This is because, when the vehicle speed is reduced, the lateral force required for the turning of the vehicle is reduced and the behavior of the vehicle is stabilized. More specifically, the VSC portion 50a first determines the torque down rate Td, which increases as the magnitude of the spin state quantity increases, and transmits this torque down rate Td to the driving control device 50c. The driving control device 50c determines a required driving torque given to the driving device, referring to the torque down rate Td and a driver required torque determined on the basis of the amount of depression of an accelerator pedal by the driver (accelerator opening degree). The required driving torque is converted into control commands for the respective portions of the driving device for realizing that value (the control commands are a throttle opening degree and the like in the case of a gasoline engine). The control commands are then given to the respective portions of the driving device. In this manner, while the spin state quantity gives the torque down rate Td larger than 0, the drive output of the driving device is limited.

In addition to the spin state quantity, the aforementioned behavior control apparatus also calculates a turning state quantity indicating that the vehicle has fallen into or may fall into a drift-out state, an under-steer state, or an over-steer state in any known mode. The target slip rates Si for the respective wheels and the torque down rate Td may be calculated using this turning state quantity as a variable, to adjust the brake pressures of the braking devices for the respective wheels and the drive output of the driving device. In this case, when it is detected that the vehicle has fallen into or may fall into the over-steer state, the brake pressures for the respective wheels are controlled in a mode similar to that of the aforementioned spin restraint. On the other hand, when it is detected that the vehicle has fallen into or may fall into the drift-out state or the under-steer state, the target slip rates Si for that one of the front wheels which is located inside with respect to the turning direction and both the rear wheels are selectively increased. Thus, the vehicle is decelerated, and a yaw moment for turning the vehicle body inward with respect to the turning direction is generated. Then, when it is detected that the behavior of the vehicle is unstable as described above, the drive output may be limited in a mode similar to that of spin restraint in any case.

As described above, the VSC portion 50a calculates the spin state quantity, and adjusts the slip rates (i.e., braking forces) for the respective wheels or limits the drive output such that the values constituting the spin state quantity converge to 0. When the vehicle is abruptly turned right and then left or abruptly turned left and then right, namely, when abrupt steering of the vehicle is repeated twice in different directions, the spin state quantity decreases early before the vehicle body slip angle or the yaw rate converges. Thus, a phenomenon of an early reduction in the braking forces to be applied to the respective wheels to restrain the vehicle from spinning is caused. FIG. 2 shows actually measured data on a steering angle (FIG. 2A), a spin state quantity and respective terms constituting the spin state quantity (FIG. 2B), a control amount for the left wheel (a braking force applied to the front-left wheel) (FIG. 2C), a control amount for the right wheel (a braking force applied to the front-right wheel) (FIG. 2D), and a yaw rate (FIG. 2E) in the case where a phenomenon of a reduction in the spin state quantity at an early stage, namely, before convergence of the yaw rate is observed when the vehicle is abruptly steered twice in different directions (when the steering angle of the vehicle is changed to the right and then to the left) as described above. In FIG. 2, the steering angle and the yaw rate are defined on the assumption that the direction in which the vehicle is turned left is positive, and the vehicle body slip angle is defined as an angle in the direction of a speed vector viewed from a longitudinal axis of the vehicle. Accordingly, the vehicle body slip angle changes in the +direction when the vehicle is turned right.

Figure 2A:
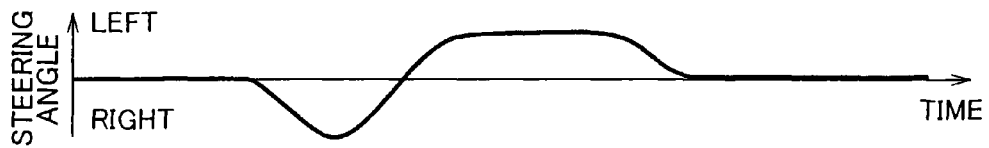
FIG. 2 is a view regarding the first embodiment of the invention, showing a steering angle (FIG. 2A), a spin state quantity and respective terms constituting the spin state quantity (FIG. 2B), a control amount for a left wheel (a braking force applied to a front-left wheel) (FIG. 2C), a control amount for a right wheel (a braking force applied to a front-right wheel) (FIG. 2D), and a yaw rate (FIG. 2E) in the case where a steering angle is changed to the right and then to the left through abrupt steering of the vehicle.
Figure 2B:
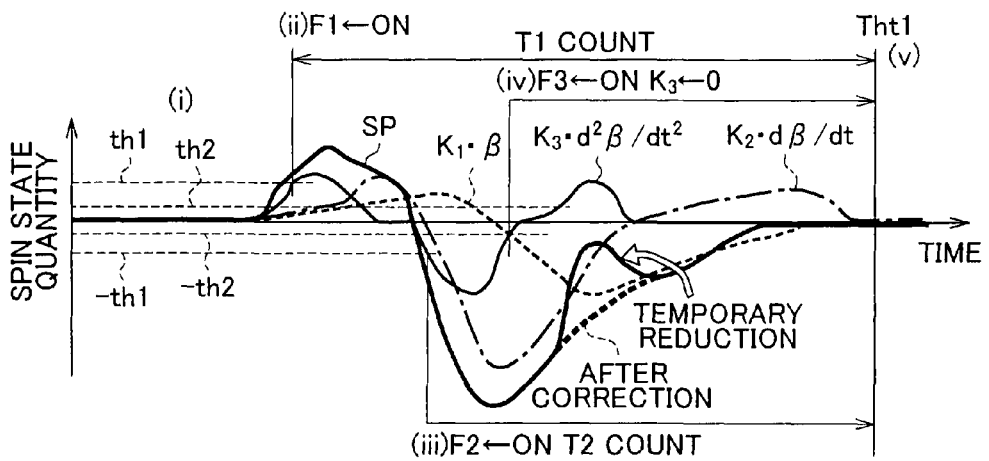
Figure 2C:
Figure 2D:
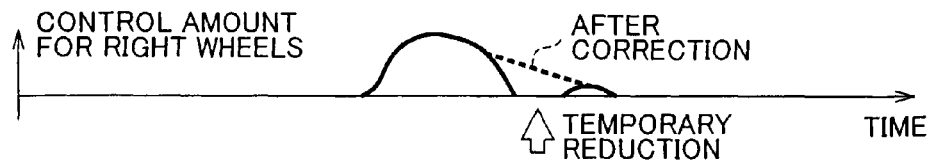

As shown in FIGS. 2A and 2B, when the steering angle is abruptly changed to the right, the term of the second order derivative of the vehicle body slip angle ($K3 \cdot d^2\beta/dt^2$: a thin solid line) as one of the terms constituting the spin state quantity SP first increases. After that, the term of the derivative of the vehicle body slip angle ($K2 \cdot d\beta/dt$: alternate long and short dash lines) and the term of the vehicle body slip angle ($K1 \cdot \beta$: broken lines) increase in this sequence. In this case, the term of the second order derivative of the vehicle body slip angle responds swiftly. Therefore, the spin state quantity SP (a thick solid line) substantially follows changes in the steering angle in FIG. 2B, and simply changes substantially upward convexly as shown in FIG. 2B. Thus, the control amount for the left wheel is generated substantially upward convexly as exemplified in FIG. 2C.

Then, when the vehicle is turned right as described above and then is turned left, the term of the second order derivative of the vehicle body slip angle swiftly responds to the change this time, and changes downward convexly in FIG. 2B. After some delay, the term of the derivative of the vehicle body slip angle changes downward convexly according to the sequence. Thus, the spin state quantity changes downward, and the control amount for the right wheel is generated as exemplified in FIG. 2D. When the term of the derivative of the vehicle body slip angle starts decreasing from an upper peak value, there is a period in which the term of the second order derivative of the vehicle body slip angle is transiently held substantially at 0. As described already, this is because the dead zone is provided for the second order derivative of the vehicle body slip angle.

Figure 2E:
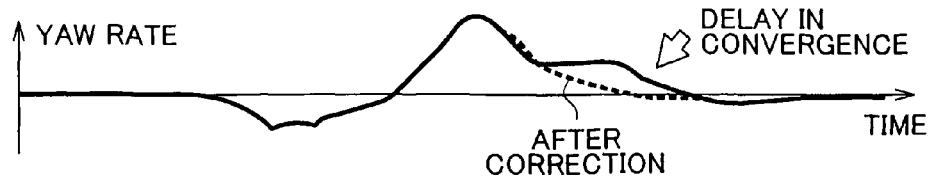

When the control amount for the right wheel, namely, the braking force for the front-right wheel increases, a yaw moment for turning the vehicle outward with respect to the turning direction (right) is given to the vehicle. As a result, the vehicle starts being restrained from spinning. After that, however, when the magnitude of the term of the derivative of the vehicle body slip angle starts decreasing due to the effect of this control amount for the right wheel (starts rising from a lower peak value), the term of the second order derivative of the vehicle body slip angle swiftly responds to the change, and changes upward again in FIG. 2B before the convergence of the term of the derivative of the vehicle body slip angle and the term of the vehicle body slip angle. Then, as shown in FIG. 2B, the magnitude of the spin state quantity temporarily decreases (in a region indicated by a blank arrow). Accordingly, the control for the right wheel decreases as well, and the effect of restraining the vehicle from spinning is hindered. Then, due to this temporary weakening of the effect of restraining the vehicle from spinning, the convergence of the yaw rate is delayed as shown in FIG. 2E.

Thus, with a view to avoiding the phenomenon of the convergence of the yaw rate being delayed as a result of the temporary weakening of the effect of restraining the vehicle from spinning after the vehicle is abruptly steered twice in succession in different directions as described above, in the behavior control apparatus according to this embodiment of the invention, the processing of calculating the spin state quantity is so corrected as to temporarily reduce or ignore the contribution of the term of the second order derivative of the vehicle body slip angle to the spin state quantity after the vehicle is abruptly steered twice. In this embodiment of the invention, the term of the second order derivative of the vehicle body slip angle is monitored. When the term of the second order derivative of the vehicle body slip angle deviates in different directions from a threshold range within a predetermined period, it is determined that the vehicle has been abruptly steered twice in different directions. This is because when the vehicle starts turning, the vehicle body slip angle changes and the term of the second order derivative of the vehicle body slip angle first changes while following changes in the steering angle. When the sign of the term of the second order derivative of the vehicle body slip angle is reversed after that determination is affirmed, the contribution of the term of the second order derivative of the vehicle body slip angle to the spin state quantity is thereafter temporarily ignored.

Figure 3:
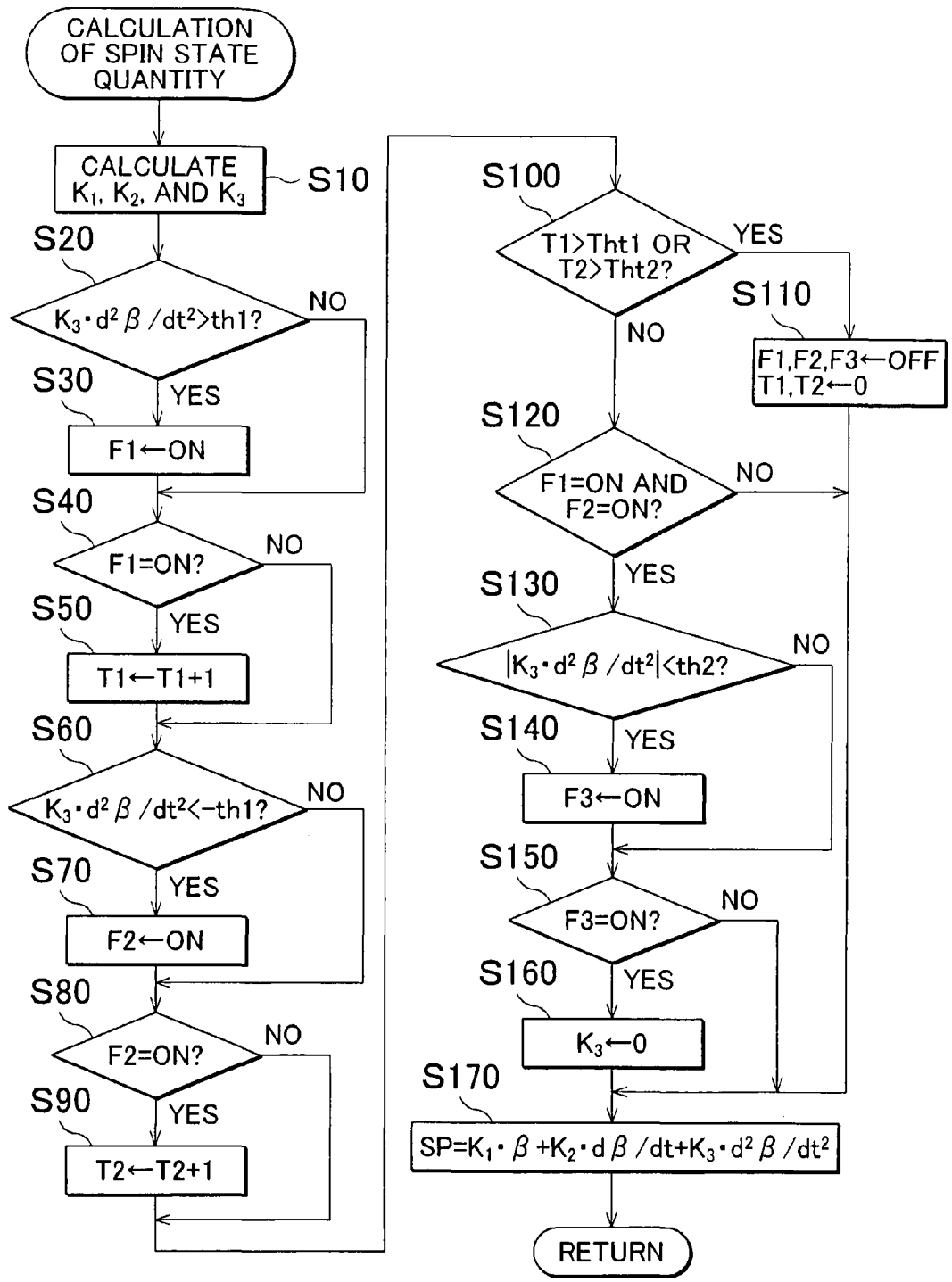
FIG. 3 is a flowchart showing a processing of calculating a spin state quantity in the behavior control apparatus according to the first embodiment of the invention.

FIG. 3 is a flowchart showing a processing of calculating the spin state quantity in the behavior control apparatus according to the first embodiment of the invention. Processings shown in FIG. 3 are repeatedly performed by the VSC portion 50a during the running of the vehicle at intervals of a predetermined processing cycle time.

Referring to FIG. 3, the calculation processing shown in FIG. 3 is broadly composed of the following processings (a), (b), (c), (d), (e), and (f). In the processing (a) [step 10], the weighting coefficients K1, K2, and K3 in the linear sum of the vehicle body slip angle, the derivative of the vehicle body slip angle, and the second order derivative of the vehicle body slip angle as expressed by the aforementioned formula (1) are determined in arbitrary modes respectively. In the processing (b) [steps 20 to 50], it is determined whether or not the vehicle has been abruptly steered to the right, and when it is determined that the vehicle has been abruptly steered to the right, a time elapsing from that moment is measured. In the processing (c) [steps 60 to 90], it is determined whether or not the vehicle has been abruptly steered to the left, and when it is determined that the vehicle has been abruptly steered to the left, a time elapsing from that moment is measured. In the processing (d) [steps 100 and 120], it is determined whether or not the vehicle has been abruptly steered in the other direction within a predetermined period after the vehicle has been abruptly steered to the right or to the left. In the processing (e) [steps 130 to 160], a time when the sign of the term of the second order derivative $K3 \cdot d^2\beta/dt^2$ of the vehicle body slip angle in the spin state quantity is reversed is detected when the vehicle has been abruptly steered in the other direction within the predetermined period after the vehicle has been abruptly steered to the right or to the left, and the coefficient K3 is set to 0 when the sign is thus reversed. In the processing (f) [step 170], the spin state quantity is calculated using the coefficients K1 to K3 given according to the aforementioned processings.

In the aforementioned processing configuration, first of all in the processing (a), the weighting coefficients used in the linear sum of the spin state quantity in the formula (1) are determined from experimentally obtained data (step 10).

In the aforementioned processing (b), it is first determined whether or not the term of the second order derivative $K3 \cdot d^2\beta/dt^2$ of the vehicle body slip angle in the spin state quantity is larger than a predetermined threshold th1, namely, whether or not a formula: $K3 \cdot d^2\beta/dt^2 > th1$ ... (3) is established (step 20). If the formula (3) is established, it is determined that the vehicle has been abruptly steered to the right, and a flag F1 is set ON to memorize this abrupt steering of the vehicle (step 30). Then, once the flag F1 is set, a count T1 is incremented in a subsequently repeated processing cycle (steps 40 and 50).

In the aforementioned processing (c), it is first determined whether or not the term of the second order derivative $K3 \cdot d^2\beta/dt^2$ of the vehicle body slip angle in the spin state quantity is smaller than a predetermined threshold −th1, namely, whether or not a formula: $K3 \cdot d^2\beta/dt^2 < -th1$ ... (4) is established (step 60). If the formula (4) is established, it is determined that the vehicle has been abruptly steered to the left, and a flag F2 is set ON to memorize this abrupt steering of the vehicle (step 70). Then, once the flag F2 is set, a count T2 is incremented in a subsequently repeated processing cycle (steps 80 and 90).

Thus, in each of the aforementioned processings (b) and (c), when the vehicle is abruptly steered either to the right or to the left and it is determined that the term of the second order derivative $K3 \cdot d^2\beta/dt^2$ of the vehicle body slip angle has exceeded a corresponding side of a predetermined threshold range th1 and −th1, a corresponding one of the flags F1 and F2 is set ON, and the counting of a corresponding one of the counters T1 and T2 is started. Then, after that, when the vehicle is abruptly steered in the other direction, both the flags F1 and F2 are ON.

In the aforementioned processing (d), while the processing cycle is repeated after the counting of the counter T1 or T2 is started, it is monitored whether or not the value of the counter T1 or T2 has reached Tht1 or Tht2 (step 100), and it is determined whether or not both the flags F1 and F2 are ON. That is, it is monitored whether or not, after having exceeded one side of the predetermined threshold range th1 to −th1 through abrupt steering of the vehicle to the right or to the left, the term of the second order derivative $K3 \cdot d^2\beta/dt^2$ of the vehicle body slip angle has further exceeded the other side of the predetermined threshold range th1 to −th1 through abrupt steering of the vehicle in a direction other than that of the first abrupt steering of the vehicle before the counter T1 or T2 reaches the predetermined value Tht1 or Tht2 respectively (step 120). The aforementioned predetermined periods Tht1 and Tht2 are short periods that may be arbitrarily set, for example, two to several seconds. It should be noted herein that Tht1 and Tht2 may be equal in length to each other. In this case, accordingly, it is detected whether or not the vehicle has been abruptly steered for the second time within a short period from the first abrupt steering of the vehicle.

According to this processing (d), first of all, when the vehicle is abruptly steered neither to the right nor to the left or when the vehicle is abruptly steered only either to the right or to the left, the flags F1 and F2 in the processings (b) and (c) are not ON at the same time. Therefore, the determination in step 120 is denied. Then, the correction of calculation of the spin state quantity in the later-described processing (e) is not carried out. Further, when the predetermined period Tht1 or Tht2 elapses after the vehicle is abruptly steered either to the right or to the left, the determination in step 100 is affirmed. In this case as well, the correction of calculation of the spin state quantity in the processing (e) is not carried out. In this case, the previous setting of all the flags is reset (step 110). However, when the vehicle is abruptly steered either to the right or to the left and then abruptly steered in the other direction before the lapse of the predetermined period Tht1 or Tht2, the flags F1 and F2 are ON at the same time. Therefore, the determination in step 100 is affirmed, and the determination in step 120 is denied. Thus, it is determined that the vehicle has been abruptly steered for the second time within the short period from the first abrupt steering of the vehicle, and the correction of calculation of the spin state quantity through the processing (e) is carried out.

In the processing (e) of correcting calculation of the spin state quantity, as mentioned above, the value of the coefficient K3 is set to 0 to reduce the contribution of the term of the second order derivative $K3 \cdot d^2\beta/dt^2$ of the vehicle body slip angle to the spin state quantity. However, it is when the vehicle has just been abruptly steered for the second time, namely, when the term of the second order derivative $K3 \cdot d^2\beta/dt^2$ of the vehicle body slip angle has just exceeded the predetermined threshold range th1 to −th1 that the processing (e) is first performed. The absolute value of the term of the second order derivative $K3 \cdot d^2\beta/dt^2$ of the vehicle body slip angle is still large. It is not preferable to forcibly set the term of the second order derivative $K3 \cdot d^2\beta/dt^2$ of the vehicle body slip angle to 0 in this state. Thus, in the processing (e), a time when the value of the term of the second order derivative $K3 \cdot d^2\beta/dt^2$ of the vehicle body slip angle decreases or a time when the sign of this value is reversed is first detected. More specifically, it is determined whether or not the absolute value of the term of the second order derivative $K3 \cdot d^2\beta/dt^2$ of the vehicle body slip angle satisfies a formula: $|K3 \cdot d^2\beta/dt^2|<th2$ ... (5) (step 130). It should be noted herein that th2 is a constant that may be arbitrarily set and is smaller than the predetermined threshold th1. Then, when the formula (5) is established in the course of repetition of the processing cycle, a flag F3 is set ON to memorize the establishment of the formula (5) (step 140). Then, when the flag F3 is set ON, the determination in step 150 is affirmed, and the value of the coefficient K3 is forcibly set to 0 (step 160: K3←0). This state is held until the counter T1 or T2 counts the predetermined period Tht1 or Tht2 respectively, namely, until the predetermined period elapses after the first abrupt steering of the vehicle. This state is canceled after the lapse of the predetermined period.

Then, after a series of the aforementioned processings, the spin state quantity is calculated using the formula (1) in the processing (f). When the coefficient K3 is forcibly set to 0 through the processing (e), the term of the second order derivative $K3 \cdot d^2\beta/dt^2$ of the vehicle body slip angle is ignored. The spin state quantity SP is given by a formula: $SP=K1 \cdot \Theta' K2 \cdot d\beta/dt$ ... (1').

The aforementioned processings (a) to (f) are organized as follows in accordance with the steering state of the vehicle in FIG. 2B. (i) When the vehicle is not abruptly steered or before the vehicle is abruptly steered, the term of the second order derivative $K3 \cdot d^2\beta/dt^2$ of the vehicle body slip angle does not deviate from the predetermined threshold range th1 to −th1, and the flags F1 and F2 are all OFF. Accordingly, the determination in step 120 is denied, and the spin state quantity is calculated using the term of the second order derivative $K3 \cdot d^2\beta/dt^2$ of the vehicle body slip angle directly. (ii) When the vehicle is abruptly steered either to the right or to the left, the term of the second order derivative $K3 \cdot d^2\beta/dt^2$ of the vehicle body slip angle deviates from one side of the predetermined threshold range th1 to −th1 (deviates from the side of th1 in FIG. 2B). Then, only one of the flags F1 and F2 is set ON, and the counter T1 or T2 starts the measurement of time. At this stage, the determination in step 120 is still denied, and the spin state quantity is calculated using the term of the second order derivative $K3 \cdot d^2\beta/dt^2$ of the vehicle body slip angle directly. (iii) When the vehicle is abruptly steered either to the right or to the left and then is abruptly steered in the other direction before the lapse of the predetermined period, the term of the second order derivative $K3 \cdot d^2\beta/dt^2$ of the vehicle body slip angle deviates from the other side of the predetermined threshold range th1 to −th1 (deviates from the side of −th1 in FIG. 2B). Thus, the flags F1 and F2 are both set ON, and the determination in step 120 is affirmed. However, at this stage, the absolute value of the term of the second order derivative $K3 \cdot d^2\beta/dt^2$ of the vehicle body slip angle is still larger than the predetermined value th2, and the flag F3 remains OFF. Therefore, the determination in step 150 is denied, and the spin state quantity is calculated using the term of the second order derivative $K3 \cdot d^2\beta/dt^2$ of the vehicle body slip angle directly. (iv) When the term of the second order derivative $K3 \cdot d^2\beta/dt^2$ of the vehicle body slip angle is reversed, the absolute value of the term of the second order derivative $K3 \cdot d^2\beta/dt^2$ of the vehicle body slip angle is smaller than the predetermined value th2, and the flag F3 is ON (steps 130 and 140). Then, the determination in step 150 is affirmed, and the coefficient K3 is set to 0. The spin state quantity is calculated ignoring the term of the second order derivative $K3 \cdot d^2\beta/dt^2$ of the vehicle body slip angle. (v) When the predetermined period elapses from the first abrupt steering of the vehicle, the determination in step 100 is affirmed, and the spin state quantity is calculated using the term of the second order derivative $K3 \cdot d^2\beta/dt^2$ of the vehicle body slip angle directly. In this case, the previous setting of the flags and the counters is reset as in step 110 of FIG. 3. This also holds true when the predetermined period has elapsed from the time point corresponding to the first abrupt steering of the vehicle while the vehicle has not yet been steered for the second time.

According to the configuration of the aforementioned processings, when the vehicle is abruptly steered twice in different directions within the predetermined (short) period, the term of the second order derivative $K3 \cdot d^2\beta/dt^2$ of the vehicle body slip angle is ignored in calculation of the spin state quantity. Thus, the spin state quantity changes as indicated by round dotted lines with the description "AFTER CORRECTION" in FIG. 2B without being affected by an early increase in the term of the second order derivative $K3 \cdot d^2\beta/dt^2$ of the vehicle body slip angle after the second abrupt steering of the vehicle, namely, without being temporarily reduced. Then, due to the correction of this spin state quantity, the control amounts for the respective wheels for restraining the vehicle from spinning change without being temporarily reduced as indicated by round dotted lines with the description "AFTER CORRECTION" in FIGS. 2D and 2E. Thus, the elimination of a delay in the convergence of the yaw rate is expected.

Referring to the changes in the term of the vehicle body slip angle, the term of the derivative of the vehicle body slip angle, and the term of the second order derivative of the vehicle body slip angle in FIG. 2B, it is observed that the term of the second order derivative of the vehicle body slip angle temporarily reduces the magnitude of the spin state quantity because the sign of the term of the second order derivative of the vehicle body slip angle is reverse to the sign of both the term of the vehicle body slip angle and the derivative of the vehicle body slip angle. Accordingly, in the aforementioned flowchart of FIG. 3, it may be determined in step 130 whether or not the sign of the term of the second order derivative of the vehicle body slip angle is reverse to the sign of both the term of the vehicle body slip angle and the derivative of the vehicle body slip angle. More specifically, this determination may be made by detecting that the sign of the term of the vehicle body slip angle coincides with the sign of the derivative of the vehicle body slip angle and the sign of the term of the second order derivative of the vehicle body slip angle is reverse to that sign.

This embodiment of the invention can also be modified as follows. For example, when the contribution of the term $K3 \cdot d^2\beta/dt^2$ of the second order derivative of the vehicle body slip angle is reduced in calculating the spin state quantity after the vehicle is abruptly steered twice in different directions within the predetermined (short) period, the magnitude of the value of the term may be simply reduced instead of being ignored completely. For example, the value of the term may be made equal to or smaller than a half thereof. Further, the spin state quantity should not necessarily be expressed as the linear sum in the formula (1) but may be expressed in any other form so as to be temporarily reduced due to the aforementioned change in the second order derivative of the vehicle body slip angle. It should be understood that such a case also belongs to the scope of the invention. Furthermore, in this embodiment of the invention, the yaw moment for restraining the vehicle from spinning is given by the difference between the braking forces applied to the right wheels and the left wheels. However, in the case where the vehicle is mounted with a device capable of automatically adjusting the steering angles of the wheels, the yaw moment for restraining the vehicle from spinning may be generated through the adjustment of the steering angles of the wheels.

Next, the second embodiment of the invention will be described. The description of what is identical to the first embodiment of the invention may be omitted.

FIG. 4 shows actually measured data on a steering angle (FIG. 4A), a spin state quantity and respective terms constituting the spin state quantity (FIG. 4B), a control amount for the left wheel (a braking force applied to the front-left wheel) (FIG. 4C), a control amount for the right wheel (a braking force applied to the front-right wheel) (FIG. 4D), and a yaw rate (FIG. 4E) in the case where a phenomenon of a reduction in the spin state quantity at an early stage, namely, before convergence of the yaw rate is observed when the vehicle is abruptly steered in succession in different directions (when the steering angle of the vehicle is changed to the right and then to the left). In FIG. 4, the steering angle and the yaw rate are defined on the assumption that the direction in which the vehicle is turned left is positive, and the vehicle body slip angle is defined as an angle in the direction of a speed vector viewed from a longitudinal axis of the vehicle. Accordingly, the vehicle body slip angle changes in the +direction when the vehicle is turned right.

Figure 4A:
FIG. 4 is a view regarding the second embodiment of the invention, showing a steering angle (FIG. 4A), a spin state quantity and respective terms constituting the spin state quantity (FIG. 4B), a control amount for a left wheel (a braking force applied to a front-left wheel) (FIG. 4C), a control amount for a right wheel (a braking force applied to a front-right wheel) (FIG. 4D), and a yaw rate (FIG. 4E) in the case where a steering angle is changed to the right and then to the left through abrupt steering of the vehicle.
Figure 4B:
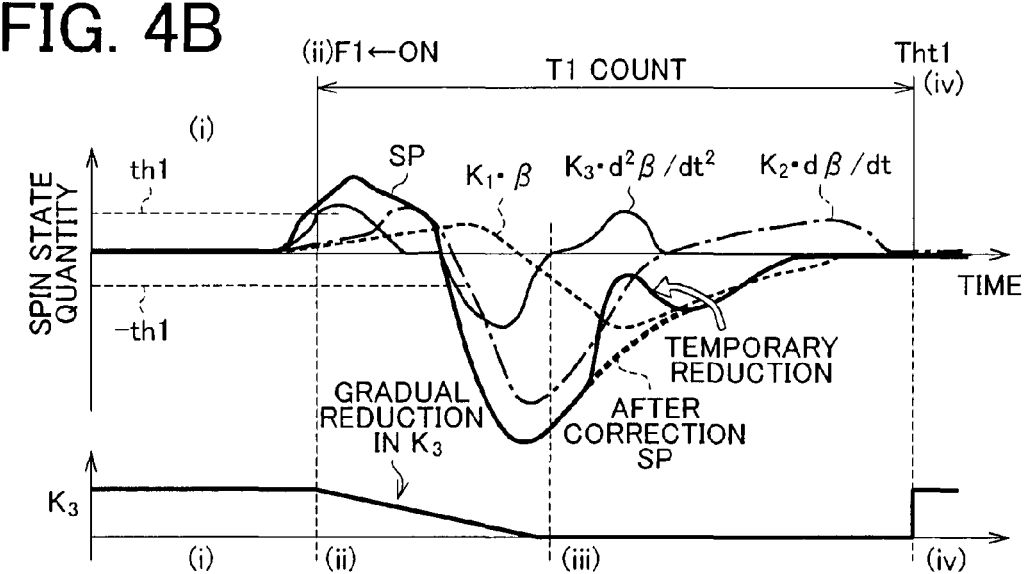
Figure 4C:
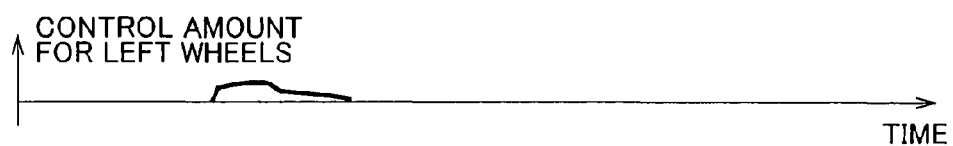
Figure 4D:
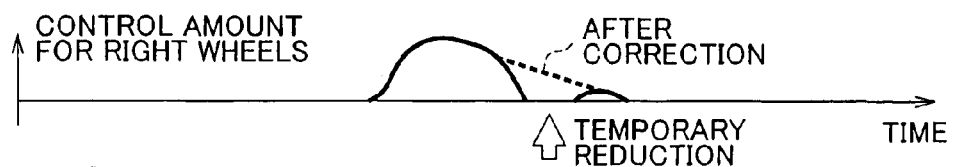
Figure 4E:
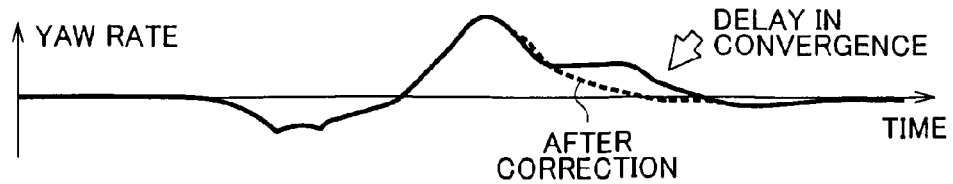

Referring to FIG. 4, first of all, when the steering angle of the vehicle is abruptly changed to the right as shown in FIG. 4A, a term of a second order derivative of a vehicle body slip angle ($K3 \cdot d^2\beta/dt^2$: a thin solid line) as a constituent term of the spin state quantity SP first increases, and a term of a derivative of the vehicle body slip angle ($K2 \cdot d\beta/dt$: alternate long and short dash lines) and a term of the vehicle body slip angle ($K1 \cdot \beta$: broken lines) then increase sequentially, as exemplified at an upper stage of FIG. 4B. In this case, the term of the second order derivative of the vehicle body slip angle responds swiftly. Therefore, the spin state quantity SP (a thick solid line) substantially follows changes in the steering angle in FIG. 4B, and simply changes substantially upward convexly. Thus, the control amount for the left wheel is generated substantially upward convexly as exemplified in FIG. 4C.

Thus, with a view to avoiding a phenomenon of the convergence of the yaw rate being delayed as a result of the temporary weakening of the effect of restraining the vehicle from spinning, which is caused by the contribution of the term of the second order derivative of the vehicle body slip angle, after the vehicle is abruptly steered once and then again in succession as described above, in the control configuration of the behavior control apparatus according to the second embodiment of the invention, the processing of calculating the spin state quantity is so corrected as to gradually exclude the contribution of the term of the second order derivative of the vehicle body slip angle to the spin state quantity after the vehicle is abruptly steered once. To achieve this configuration, in this embodiment of the invention, the term of the second order derivative of the vehicle body slip angle is monitored, and it is determined, when the term of the second order derivative of the vehicle body slip angle deviates from a predetermined threshold range, that the vehicle has been abruptly steered. This is based on the fact that when the vehicle starts turning, the vehicle body slip angle changes and the term of the second order derivative of the vehicle body slip angle first changes while following changes in the steering angle. After this determination is made, the coefficient K3 in the term of the second order derivative of the vehicle body slip angle constituting the spin state quantity is gradually reduced. Thus, the contribution of the term of the second order derivative of the vehicle body slip angle is reduced or excluded. Further, as is understood from the foregoing description of FIG. 4, the effect of restraining the vehicle from spinning temporarily weakens through the contribution of the term of the second order derivative of the vehicle body slip angle especially when the magnitude of the second order derivative of the vehicle body slip angle increases in response to the second abrupt steering of the vehicle and then increases in the other direction. Accordingly, it is preferable that the coefficient K3 be so gradually reduced as to be substantially ignorable before the term of the second order derivative of the vehicle body slip angle constituting the spin state quantity responses to the second abrupt steering of the vehicle and the magnitude of the second order derivative of the vehicle body slip angle increases and then increases in the other direction, namely, before the magnitude of the derivative of the vehicle body slip angle starts decreasing. Thus, the speed at which the coefficient K3 is gradually reduced is set such that the coefficient K3 becomes equal to 0 within a period equivalent to a period from a time point at which the vehicle is abruptly steered for the second time to a time point at which the sign of the second order derivative of the vehicle body slip angle is reversed.

Figure 5:
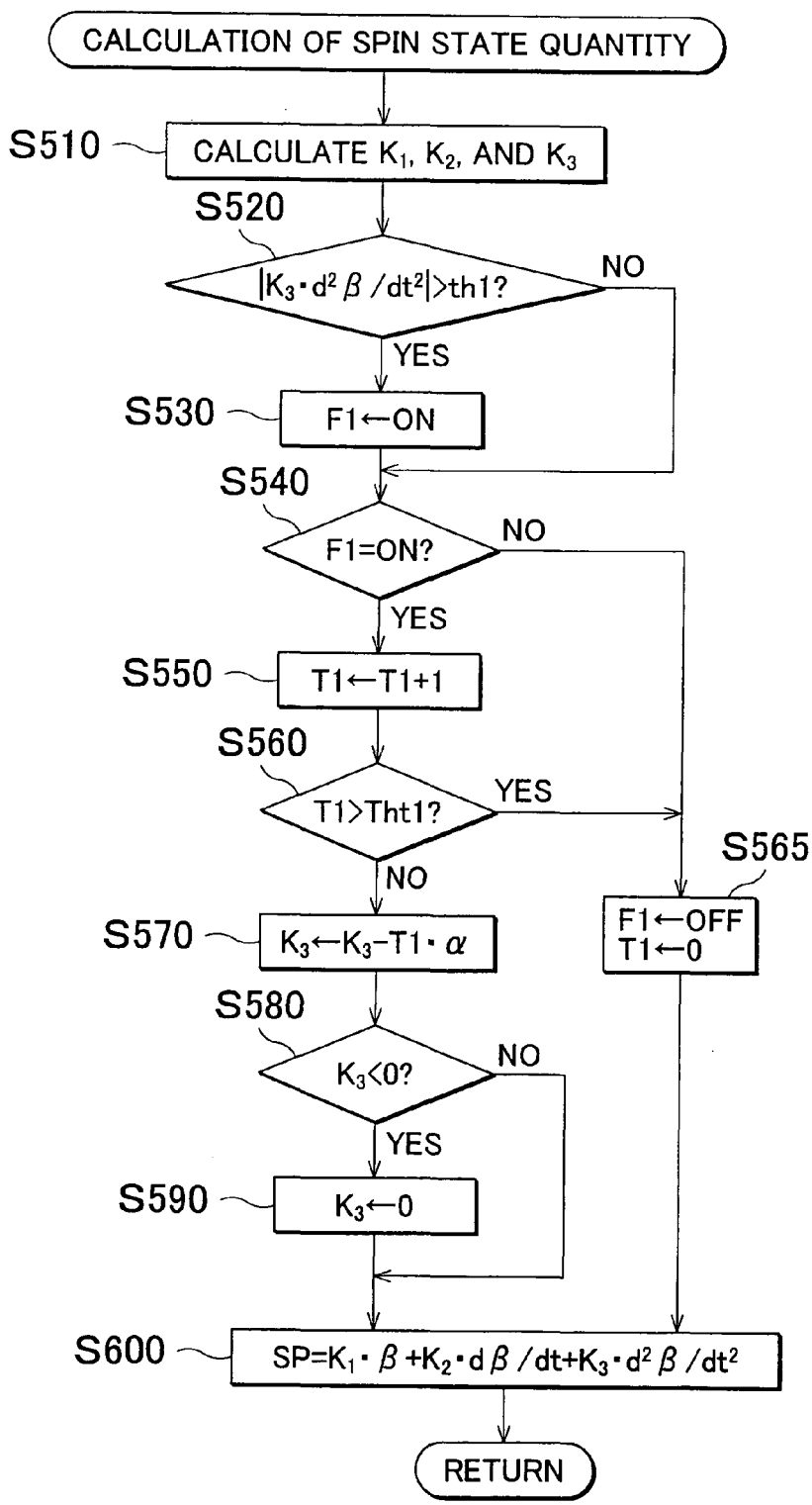
FIG. 5 is a flowchart showing a processing of calculating a spin state quantity in the second embodiment of the invention.

FIG. 5 shows a processing of calculating the spin state quantity, which achieves the aforementioned control configuration, in the form of a flowchart. Processings shown in FIG. 5 are repeatedly performed by the VSC portion 50a during the running of the vehicle at intervals of a predetermined processing cycle time.

The calculation processing shown in FIG. 5 is broadly composed of the following processings (5a), (5b), (5c), (5d), and (5e). In the processing (5a) [step 510], the weighting coefficients K1, K2, and K3 in the linear sum of the vehicle body slip angle, the derivative of the vehicle body slip angle, and the second order derivative of the vehicle body slip angle as expressed by the formula (1) mentioned in the first embodiment of the invention as well are determined in arbitrary modes respectively. In the processing (5b) [steps 520 to 550], it is determined whether or not the vehicle has been abruptly steered either to the right or to the left, and when it is determined that the vehicle has been abruptly steered, a time elapsing from that moment is measured. In the processing (5c) [steps 560 and 565], it is determined whether or not a predetermined period (second predetermined period) has elapsed after abrupt steering of the vehicle. In the processing (5d) [steps 570 to 590], the coefficient K3 of the linear sum in the aforementioned formula (1) is gradually reduced before the predetermined period elapses after abrupt steering of the vehicle. In the processing (5e) [step 600], the spin state quantity is calculated using the coefficients K1 to K3 given according to the foregoing processings.

In the processing (5a), the weighting coefficients used in the linear sum of the spin state quantity in the formula (1) are determined from experimentally obtained data (step 210).

In the aforementioned processing (5b), it is first determined whether or not the magnitude (absolute value) of the term of the second order derivative $K3 \cdot d^2\beta/dt^2$ of the vehicle body slip angle in the spin state quantity is larger than the predetermined threshold th1, namely, whether or not a formula: $|K3 \cdot d^2\beta/dt^2| > th1 \ldots$ (53) is established (step 520). If the formula (53) is established, it is determined that the vehicle has been abruptly steered, and the flag F1 is set ON to memorize this abrupt steering of the vehicle (step 530). Then, once the flag F1 is set ON, the count T1 is incremented in a subsequently repeated processing cycle (steps 540 and 550). Further, when the flag F1 is not set ON, the determination in step 40 is denied, and the linear sum in the formula (1) is directly calculated in the processing (5e) without correcting the coefficient K3 in the later-described processing (5d).

In the aforementioned processing (5c), it is determined whether or not the predetermined time has elapsed after abrupt steering of the vehicle by determining whether or not the value of the counter T1 has reached Tht1 while the calculation processing cycle shown in FIG. 5 is repeated after the counting of the counter T1 is started in response to the determination in the aforementioned processing (5b) that the vehicle has been abruptly steered either to the right or to the left (step 560). In this processing, when the predetermined period has not elapsed after abrupt steering of the vehicle, the coefficient K3 is corrected in the later-described processing (5d). When the predetermined period has elapsed after abrupt steering of the vehicle, the linear sum in the formula (1) is directly calculated in the processing (5e) without correcting the coefficient K3 in the processing (5d). In this case, the flag F1 is set OFF, and the counter is reset to 0 (step 565). The predetermined period mentioned herein is typically set to two to several seconds.

As is understood from FIG. 5 and the foregoing description, the processing of gradually reducing the coefficient K3 in the aforementioned processing (5d) is performed before the predetermined period Tht1 elapses after the vehicle is abruptly steered once. In this processing (5d), the coefficient K3 is first corrected according to a formula: $K3 \leftarrow K3 - T1 \cdot \alpha \ldots$ (54), referring to the value of the counter T1 in step 550 (step 570). It should be noted herein that K3 in the first term of the right side is the coefficient K3 determined in step 510 at the beginning of the cycle, and that cc is a constant coefficient that may be set arbitrarily. In the formula (54), accordingly, the value of T1 increases every time the cycle is repeated. Therefore, the value of K3 on the left side of the formula (54) gradually decreases every time the cycle is repeated. However, when the value of the coefficient K3 given in step 570 is negative, this coefficient K3 is set to 0 (steps 580 and 590). Then, when K3=0, the second order derivative of the vehicle body slip angle is completely ignored in the linear sum in the formula (1).

As described already, the effect of spin restraint control weakens in the case of successive repetition of abrupt steering of the vehicle when the control effect of spin restraint control starts manifesting itself in the course of the second abrupt steering of the vehicle, namely, after the magnitude of the derivative of the vehicle body slip angle has reached its peak after the second abrupt steering of the vehicle. Accordingly, it is preferable that the second order derivative of the vehicle body slip angle be completely ignored by that moment. Thus, the constant coefficient $\alpha$ for determining the speed at which the coefficient K3 is gradually reduced in the formula (54) is set such that the coefficient K3 can be made equal to or smaller than 0 within the period (the first predetermined period) equivalent to the period from the time point at which the vehicle is first abruptly steered to the time point at which the magnitude of the derivative of the vehicle body slip angle reaches its peak after the second abrupt steering of the vehicle. The period equivalent to the period from the time point at which the vehicle is first abruptly steered to the time point at which the magnitude of the derivative of the vehicle body slip angle reaches its peak after the second abrupt steering of the vehicle is shorter than the period equivalent to the threshold Tht1 of the counter T1. Therefore, the constant coefficient $\alpha$ may be typically set such that the period to the time point at which the coefficient K3 reaches 0 becomes equal to or shorter than 2 seconds.

Then, after a series of the aforementioned processings, the spin state quantity is calculated using the formula (1) in the processing (5e). While the coefficient K3 is gradually reduced in the processing (5d), the contribution of the term of the second order derivative of the vehicle body slip angle in the formula (1) is gradually reduced. When the coefficient K3 is gradually reduced to become equal to or smaller than 0, the term of the second order derivative $K3 \cdot d^2\beta/dt^2$ of the vehicle body slip angle is ignored. As a result, the spin state quantity SP is given by the formula: $SP = K1 \cdot \beta + K2 \cdot d\beta/dt \ldots$ (1').

The aforementioned processings (5a) to (5e) are organized as follows in accordance with the steering state of the vehicle exemplified in FIG. 4B. (i) When the vehicle is not abruptly steered or before the vehicle is abruptly steered, the magnitude of the term of the second order derivative $K3 \cdot d^2\beta/dt^2$ of the vehicle body slip angle does not deviate from the predetermined threshold range th1 to −th1, and the flag F1 is OFF. Accordingly, the determination in step 540 is denied, and the spin state quantity is calculated using the term of the second order derivative $K3 \cdot d^2\beta/dt^2$ of the vehicle body slip angle directly. (ii) When the vehicle is abruptly steered either to the right or to the left, the term of the second order derivative $K3 \cdot d^2\beta/dt^2$ of the vehicle body slip angle deviates from one side of the predetermined threshold range th1 to −th1 (deviates from the side of th1 in FIG. 4B). Then, the flag F1 is set ON, and the counter T1 starts the measurement of time. Further, in this case, the processing in step 570 is performed to gradually reduce the coefficient K3 of the linear sum in the formula (1) according to the formula (54) as exemplified at the lower stage of FIG. 4B. The spin state quantity is then calculated using the reduced coefficient K3. (iii) When the magnitude of the derivative of the vehicle body slip angle reaches its peak after the vehicle is abruptly steered either to the right or to the left and then abruptly steered in the other direction, the processings in steps 570 to 590 are performed to set the value of the coefficient K3 of the linear sum in the formula (1) to 0. Thus, the term of the second order derivative of the vehicle body slip angle in the spin state quantity is completely ignored. (iv) When the predetermined period elapses from the first abrupt steering of the vehicle (when the counter T1 reaches Tht1), the determination in step 560 is affirmed, and the spin state quantity is calculated using directly the term of the second order derivative $K3 \cdot d^2\beta/dt^2$ of the vehicle body slip angle (in which the coefficient K3 given in step 510 is used). In this case, the previous setting of the flags and the counters is reset as indicated by step 565 of FIG. 5.

According to the configuration of the aforementioned processings, once the vehicle is abruptly steered, the contribution of the term of the second order derivative $K3 \cdot d^2\beta/dt^2$ of the vehicle body slip angle is first reflected, then gradually reduced, and eventually ignored. Then, the spin state quantity changes as indicated by round dotted lines with the description "AFTER CORRECTION" in FIG. 4B without being affected by an early increase in the term of the second order derivative $K3 \cdot d^2\beta/dt^2$ of the vehicle body slip angle after the second abrupt steering of the vehicle, namely, without being temporarily reduced. Then, due to the correction of this spin state quantity, the control amounts of the respective wheels for restraining the vehicle from spinning change without being temporarily reduced as indicated by round dotted lines with the description "AFTER CORRECTION" in FIGS. 4D and 4E. Thus, the elimination of a delay in the convergence of the yaw rate is expected. In the example of FIG. 4, the vehicle is first abruptly steered to the right and then to the left. By the same token, however, when the vehicle is first abruptly steered to the left, the contribution of the term of the second order derivative $K3 \cdot d^2\beta/dt^2$ of the vehicle body slip angle is gradually reduced and eventually ignored.

This embodiment of the invention can also be modified as follows. For example, when the contribution of the term of the second order derivative $K3 \cdot d^2\beta/dt^2$ of the vehicle body slip angle is reduced in calculating the spin state quantity after the vehicle is abruptly steered in this embodiment of the invention, the magnitude of the value of the term may be simply reduced instead of being ignored completely. For example, the value of the term may be made equal to or smaller than a half thereof. Further, the spin state quantity should not necessarily be expressed as the linear sum in the formula (1) but may be expressed in any other form so as to be temporarily reduced due to the aforementioned change in the second order derivative of the vehicle body slip angle. It should be understood that such a case also belongs to the scope of the invention. Furthermore, in this embodiment of the invention, the yaw moment for restraining the vehicle from spinning is given by the difference between the braking forces applied to the right wheels and the left wheels. However, in the case where the vehicle is mounted with a device capable of automatically adjusting the steering angles of the wheels, the yaw moment for restraining the vehicle from spinning may be generated through the adjustment of the steering angles of the wheels.

While the invention has been described with reference to the example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A vehicle behavior control apparatus comprising:
a slip angle detector that detects a slip angle of a vehicle;
a control amount calculation portion that calculates a control amount from the slip angle detected by the slip angle detector, a derivative of the slip angle, and a second order derivative of the slip angle; and
a control portion that executes a behavior control for the vehicle based on the calculated control amount,
wherein the second order derivative of the vehicle body slip angle has a contribution to the control amount which is reduced when within a predetermined period after a magnitude of the second order derivative of the vehicle body slip angle exceeds a predetermined value through steering of the vehicle either to a right or to a left, the magnitude of the second order derivative of the vehicle body slip angle exceeds the predetermined value through steering of the vehicle in the other direction.

2. A vehicle behavior control apparatus that restrains a vehicle from spinning, comprising:
means for calculating a control amount calculated from a vehicle body slip angle, a derivative of the vehicle body slip angle, and a second order derivative of the vehicle body slip angle; and
means for controlling the vehicle based on the calculated control amount,
wherein the second order derivative of the vehicle body slip angle has a contribution to the control amount which is reduced when within a predetermined period after a magnitude of the second order derivative of the vehicle body slip angle exceeds a predetermined value through steering of the vehicle either to a right or to a left, the magnitude of the second order derivative of the vehicle body slip angle exceeds the predetermined value through steering of the vehicle in the other direction.

3. The control apparatus according to claim 2, wherein the contribution of the second order derivative of the vehicle body slip angle to the control amount is ignored when within the predetermined period after the magnitude of the second order derivative of the vehicle body slip angle exceeds the predetermined value through the steering of the vehicle either to the right or to the left, the magnitude of the second order derivative of the vehicle body slip angle exceeds the predetermined value through the steering of the vehicle in the other direction.

4. The control apparatus according to claim 2, wherein the contribution of the second order derivative of the vehicle body slip angle to the control amount is reduced when within the predetermined period after the magnitude of the second order derivative of the vehicle body slip angle exceeds the predetermined value through the steering of the vehicle either to the right or to the left, the magnitude of the second order derivative of the vehicle body slip angle exceeds the predetermined value through the steering of the vehicle in the other direction and then becomes smaller than a second predetermined value smaller than the predetermined value.

5. The control apparatus according to claim 2, wherein the contribution of the second order derivative of the vehicle body slip angle to the control amount is reduced when a sign of the second order derivative of the vehicle body slip angle in the control amount becomes reverse to a sign of both the vehicle body slip angle and the derivative of the vehicle body slip angle.

6. A vehicle behavior control apparatus that restrains a vehicle from spinning, comprising:
means for calculating a control amount calculated from a vehicle body slip angle, a derivative of the vehicle body slip angle, and a second order derivative of the vehicle body slip angle; and
means for controlling the vehicle based on the calculated control amount,
wherein the second order derivative of the vehicle body slip angle has a contribution to the control amount which is gradually reduced after a magnitude of the second order derivative of the vehicle body slip angle exceeds a predetermined value through steering of the vehicle either to a right or to a left.

7. The control apparatus according to claim 6, wherein the contribution of the second order derivative of the vehicle body slip angle to the control amount is so reduced as to be ignored when a first predetermined period elapses after the magnitude of the second order derivative of the vehicle body slip angle exceeds the predetermined value through the steering of the vehicle either to the right or to the left.

8. The control apparatus according to claim 2, wherein the contribution of the second order derivative of the vehicle body slip angle to the control amount is stopped from being reduced after a second predetermined period longer than the first predetermined period elapses.

9. The control apparatus according to claim 2, wherein the control amount is given by a formula: $K1 \cdot \beta + K2 \cdot d\beta/dt + K3 \cdot d^2\beta/dt^2$ in which $\beta$, $d\beta/dt$, $d^2\beta/dt^2$, K1, K2, and K3 denote the vehicle body slip angle, the derivative of the vehicle body slip angle, the second order derivative of the vehicle body slip angle, and predetermined coefficients respectively.

10. The control apparatus according to claim 9, wherein the coefficient K3 is gradually reduced when the contribution of the second order derivative of the vehicle body slip angle to the control amount is reduced.

11. The control apparatus according to claim 2, wherein the vehicle is restrained from spinning by a yaw moment generated on a basis of the control amount.

12. The control apparatus according to claim 2, wherein the vehicle is restrained from being accelerated on a basis of the control amount.

13. A vehicle behavior control method comprising:
detecting, using a slip angle detector, a slip angle of a vehicle;
calculating, using an electronic control unit, a control amount from the detected slip angle, a derivative of the slip angle, and a second order derivative of the slip angle; and
executing, using the electronic control unit, behavior control for the vehicle on a basis of the calculated control amount,
wherein the second order derivative of the vehicle body slip angle has a contribution to the control amount which is reduced when within a predetermined period after a magnitude of the second order derivative of the vehicle body slip angle exceeds a predetermined value through steering of the vehicle either to a right or to a left, the magnitude of the second order derivative of the vehicle body slip angle exceeds the predetermined value through steering of the vehicle in the other direction.

14. A vehicle behavior control method comprising:
detecting, using a slip angle detector, a vehicle body slip angle;
calculating, using an electronic control unit, a control amount from the detected slip angle, a derivative of the slip angle, and a second order derivative of the slip angle; and
reducing, using the electronic control unit, a contribution of the second order derivative of the vehicle body slip angle to the control amount when within a predetermined period after a magnitude of the second order derivative of the vehicle body slip angle exceeds a predetermined value through steering of the vehicle either to a right or to a left, the magnitude of the second order derivative of the vehicle body slip angle exceeds the predetermined value through steering of the vehicle in the other direction.

15. A vehicle behavior control method comprising:
detecting, using a slip angle detector, a vehicle body slip angle;
calculating, using an electronic control unit, a control amount from the detected slip angle, a derivative of the vehicle body slip angle, and a second order derivative of the vehicle body slip angle; and
gradually reducing, using the electronic control unit, a contribution of the second order derivative of the vehicle body slip angle to the control amount after a magnitude of the second order derivative of the vehicle body slip angle exceeds a predetermined value through steering of a vehicle either to a right or to a left.

16. The control apparatus according to claim 6, wherein the contribution of the second order derivative of the vehicle body slip angle to the control amount is stopped from being reduced after a second predetermined period longer than the first predetermined period elapses.

17. The control apparatus according to claim 6, wherein the control amount is given by a formula: $K1 \cdot \beta + K2 \cdot d\beta/dt + K3 \cdot d^2\beta/dt^2$ in which $\beta$, $d\beta/dt$, $d^2\beta/dt^2$, K1, K2, and K3 denote the vehicle body slip angle, the derivative of the vehicle body slip angle, the second order derivative of the vehicle body slip angle, and predetermined coefficients respectively.

18. The control apparatus according to claim 17, wherein the coefficient K3 is gradually reduced when the contribution of the second order derivative of the vehicle body slip angle to the control amount is reduced.

19. The control apparatus according to claim 6, wherein the vehicle is restrained from spinning by a yaw moment generated on a basis of the control amount.

20. The control apparatus according to claim 6, wherein the vehicle is restrained from being accelerated on a basis of the control amount.

* * * * *